United States Patent [19]

Miura

[11] Patent Number: 4,644,159

[45] Date of Patent: Feb. 17, 1987

[54] IMAGE READING DEVICE

[75] Inventor: Masaaki Miura, Tokyo, Japan

[73] Assignee: Asahi Kogaku Kogyo Kabushiki Kaisha, Tokyo, Japan

[21] Appl. No.: 583,535

[22] Filed: Feb. 24, 1984

[30] Foreign Application Priority Data

Feb. 24, 1983 [JP] Japan ................... 58-29858

[51] Int. Cl.⁴ ............................................. H01J 3/16
[52] U.S. Cl. .................................. 250/239; 250/216; 250/578
[58] Field of Search ....................... 250/239, 216, 578

[56] References Cited

U.S. PATENT DOCUMENTS 3,214,596 10/1965 Schwerdt, Jr. et al. ............ 250/239
4,201,910 5/1980 Copeland et al. .................. 250/216
4,495,422 1/1985 Wiggins .......................... 250/237 R Primary Examiner—John P. McIntosh
Attorney, Agent, or Firm—Sughrue, Mion, Zinn, Macpeak & Seas

[57] ABSTRACT

An image reading device, such as may be employed in a facsmile transmitter, laser beam printer, copying machine, or the like, in which assembly and alignment of optical components of the system is simplified and stray light is prevented from reaching a photoelectric conversion element. The optical system and the photoelectric conversion element are fixedly secured to a single supporting frame in a desired predetermined positional relationship. The supporting frame is detachably mounted on a mounting surface of an image reading device body. The optical system includes a filter or dust-proof transparent cover, an optical path changing mirror, and an image forming lens, all of which are secured to the supporting frame. A light-quantity-distribution correcting light-shielding plate may be provided in front of the image forming lens to provide an even distribution of image light on the photoelectric conversion element.

4 Claims, 5 Drawing Figures

IMAGE READING DEVICE

BACKGROUND OF THE INVENTION

The present invention relates to an image reading device. More particularly, the invention relates to the mounting structure of a photoelectric conversion device used for converting an optical image into an electrical signal.

In an image reading device of the same general type to which the invention pertains, which may be employed in a facsimile transmitter, laser beam printer, copying machine or the like, in general, a slit-shaped light beam reflected from an illuminated object is applied through an image forming lens to a photoelectric conversion element, the output of which is an electrical signal representing the image. In a conventional image reading device, various components of the optical system, such as an optical path changing mirror, an image forming lens, and a photoelectric conversion element, are fixedly mounted on the mounting surface of the image reading device body. These elements are individually adjusted in position. FIG. 1 shows the above-described conventional device.

In FIG. 1, reference numeral 11 designates the body of the image reading device, and reference numeral 12 a mounting surface of the body. The holding frame 14 of an optical path changing mirror 13, the holding frame 16 of an image forming lens 15, and the support 18 of a photoelectric conversion element 17 are secured to the mounting surface 12 with screws 19. A dust-collecting filter 20 is also held by the holding frame 14. A slit-shaped reflected light beam, which is perpendicular to the surface of the figure at the point A, of an image 21 is applied through the filter 20 to the optical path changing mirror 13, and is then applied through the lens 15 to the photoelectric conversion element 17. In FIG. 1, reference number 22 designates a light source for illuminating the object 21 to be read, which may be a document of any kind. The image reading device body 11 operates to process the electrical signal representing the image of the object 21 produced by the photoelectric conversion element 17, and to provide other signals for various purposes. Further details of the image reading device are determined by its particular application, namely, in a laser beam printer, copying machine, etc.

In the conventional device, the holding frames 14 and 16 and the support 18 are individually secured to the mounting surface 12. Therefore, the conventional device suffers from a drawback in it is difficult to position and maintain the position of the various components of the device with high accuracy. Also, since the optical path changing mirror 13, the image forming lens 15 and the photoelectric conversion element 17 are exposed, stray ambient light (other than the reflected light beam) may reach the photoelectric conversion element 17, thus adversely affect the image signal. Still further, another problem is that dust is liable to stick to these components.

A primary object of the invention is therefore to eliminate the above-described difficulties accompanying a conventional image reading device.

SUMMARY OF THE INVENTION

In accordance with the above and other objects, an image reading device according to the invention is provided in which an optical system for applying a light beam reflected from an object to be read to a photoelectric conversion element and the photoelectric conversion element are fixedly secured to a single supporting frame in a predetermined positional relationship, and the supporting frame is detachably mounted on the mounting surface. The supporting frame may be a closed frame so as to prevent the entrance of harmful stray light.

DESCRIPTION OF THE PREFERRED EMBODIMENTS

Figure 1:
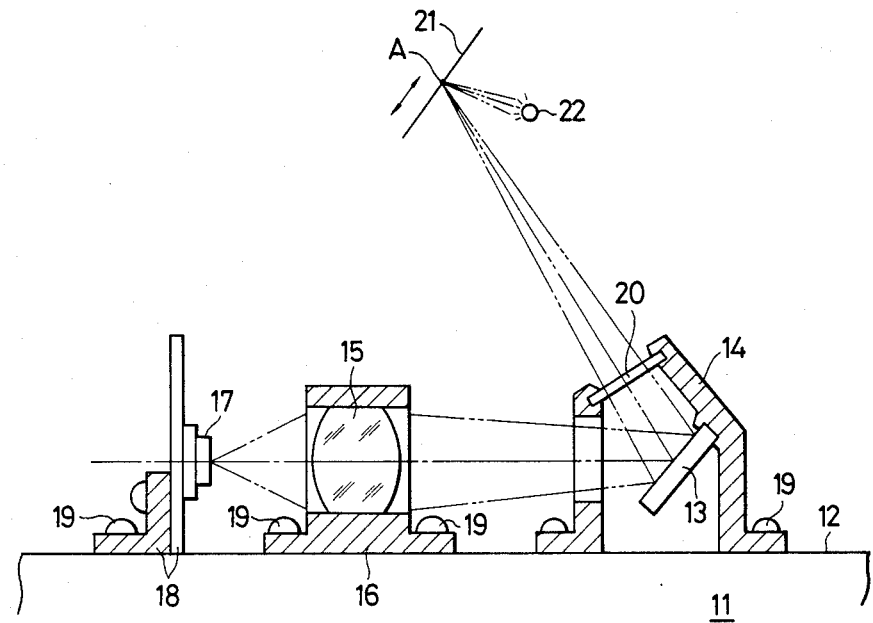
FIG. 1 is a longitudinal cross-sectional view showing an example of a conventional image reading device.
Figure 2:
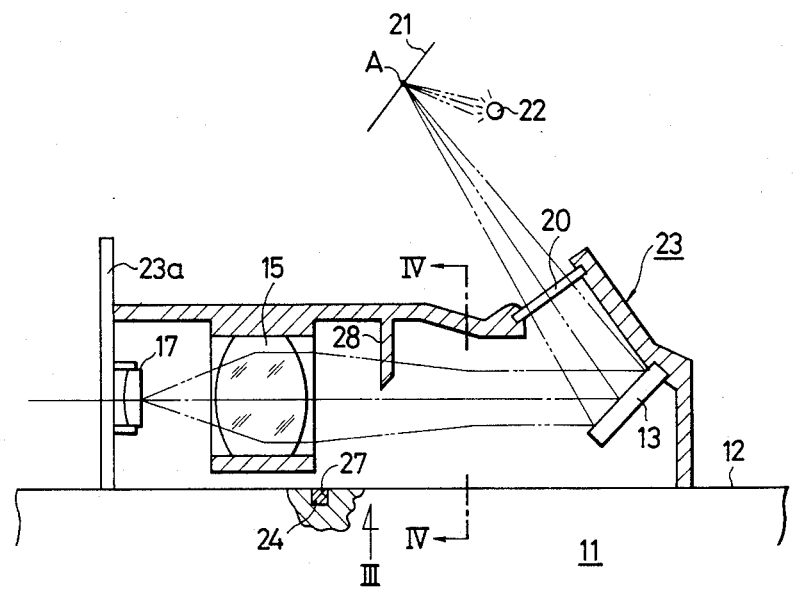
FIG. 2 is a longitudinal cross-sectional view showing an example of an image reading device according to the invention.
Figure 3:
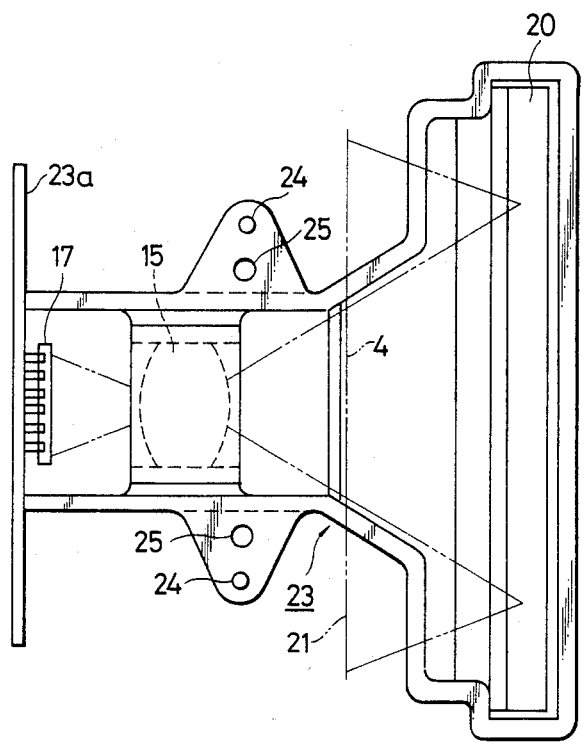
FIG. 3 is a view taken in the direction of an arrow III in FIG. 2.

A preferred embodiment of the invention will be described with reference to FIGS. 2 through 5. In these figures, an image reading device body 11, a mounting surface 12, an optical path changing mirror 13, an image forming lens 15, a photoelectric conversion element 17, and a filter 20 are similar to those of the conventional device which has been described with reference to FIG. 1. Specific features of the invention are that, of these components, the optical components, namely, the filter 20, the mirror 13, the lens 15 and the element 17, are fixedly secured to a single supporting frame 23 in such a manner that they are in a predetermined positional relationship, and that the supporting frame 23 is fixedly secured to the mounting surface 12 with positioning pins 24 and screws 26 inserted into mounting holes. The photoelectric conversion element 17 is fixedly secured to a supporting plate 23a, which in turn is secured to the supporting frame 23. The positioning pins 24 extend from the supporting frame 23. The mounting surface 12 has positioning holes 27 into which the pins 24 of the supporting frame 23 are inserted.

The supporting frame 23 is a closed frame which has an opening in which the filter 20 is mounted and an opening which is covered by the mounting surface 12. Accordingly, light can enter the supporting frame 23 only through the filter. The inner surface of the supporting frame 23 is made nonreflective.

The supporting frame 23 of the device is mounted on the mounting surface 12 by positioning pins 24 inserted into the positioning holes 27 in the mounting surface 12. The fixing screws 26 are inserted into the mounting holes 25 and are then screwed into threaded holes in the mounting surface 12. Since the filter 20, the mirror 13, the lens 15 and the element 17 have been fixedly secured to the supporting frame 23 in the desired positional relationship, and the position of the supporting frame 23 has been determined by the positioning pins 24 and the positioning holes 27, the optical system of the device can be readily assembled with high accuracy without the need for separate adjustment of the positions of these components.

The image reading operation of the device thus arranged is similar to that of the conventional device. A light beam from the light source 22 is applied to the object to be read, with the light beam being in the form of a slit extending in a direction perpendicular to the surface of the drawing at the point A. The reflected light beam is applied through the filter 20 to the optical path changing mirror 13. The reflected light beam is reflected by the mirror 13, and is then applied through the image forming lens 15 to the photoelectric conversion element 17, thus forming an image thereon.

Figure 5:
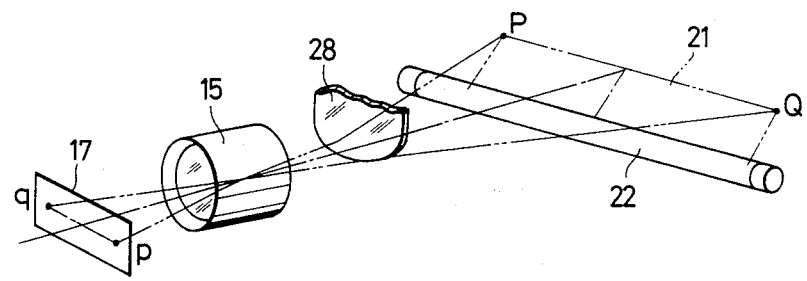
FIG. 5 is a perspective view showing essential components of the device of the invention used for a description of the effect of a light shielding plate.
Figure 4:
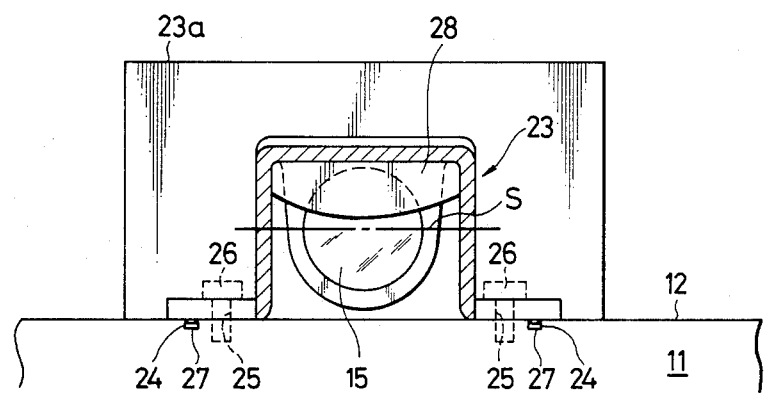
FIG. 4 is a cross-sectional view taken along a line IV—IV in FIG. 2.

A slit-shaped part P-Q of the object 21 which has been illuminated by the light source 22 forms an image p-q on the photoelectric conversion element 17. In this case, the quantity of light of the image p-q is high at the central portion, but low at both end portions. That is, the quantity of light is not uniform over the image p-q. In order to overcome this difficulty, a light shielding plate 28 as shown in FIGS. 4 and 5 is employed in the device of invention. The light shielding plate 28 is arcuate. More specifically, the configuration of the plate 28 is such that its arcuate edge is closest to a horizontal plane S containing the optical axis at the lowermost point above the optical axis and gradually curves away from the horizontal plane S towards both ends. The use of the light shielding plate 28 averages the quantity of light over the photoelectric conversion element 17, thus providing an image signal with higher accuracy.

In the above-described embodiment, the filter 20 serves as a dustproof cover. However, it may be replaced by a transparent cover which provides no filtering function if desired.

As is apparent from the above description, according to the invention, the optical system for applying a light beam reflected from the object to the photoelectric conversion element and the photoelectric conversion element are fixedly secured to one and the same supporting frame, and the supporting frame is detachably mounted on the mounting surface of the image reading device body. Therefore, the adjustment of the optical system and the photoelectric conversion element during assembly, which was considerably difficult in the prior art arrangement, can be readily achieved irrespective of other mechanisms. As the supporting frame is detachably mounted on the mounting surface, maintenance of the device can easily be performed. The supporting frame has a closed construction, and the inner surface thereof is made nonreflective so that no stray light can be reflected thereby. Therefore, no stray ambient or other light will strike the photoelectric conversion element, with the result that image signals are provided with high accuracy. Furthermore, the light shielding plate employed according to the invention averages the quantity of light over the photoelectric conversion element.

I claim:

1. In an image reading device in which an image of an object is applied through an optical system, having at least a reflective optical element and an image forming lens defining therebetween an optical axis, said optical axis lying in a first plane, to a photoelectric conversion means, and said photoelectric conversion means produces an electrical signal representing the image of said object, the improvement comprising: said optical system and said photoelectric conversion means being fixedly secured to a single supporting frame in a predetermined positional relationship, and said supporting frame being detachably mounted on a mounting surface of an image reading device body; and wherein said supporting frame further comprises a light-shielding plate having a first end attached to said frame and a free second end with an arcuate edge extending toward and being proximate to said optical axis, said arcuate edge of said plate being closest to said optical axis at a central portion of said edge and gradually curving away from said optical axis towards both ends of said edge, said plate being disposed between said image forming lens and said reflective optical element whereby quantities of light are blocked more at said central portion than at said end portions and said quantity of light at said photoelectric conversion means is made substantially uniform.

2. The image reading device as claimed in claim 1, wherein said optical system further comprises: at least one of a filter and dust-proof transparent cover, wherein at least one of said filter and dust-proof transparent cover, said optical path changing mirror and said image forming lens are secured to said supporting frame.

3. The image reading device as claimed in claim 2, wherein said supporting frame comprises a closed frame having an opening in which at least one of said filter and dust-proof transparent cover is mounted, and an opening covered by said mounting surface, a light beam reflected from said object entering said closed frame through said filter.

4. The image reading device as claimed in claim 3, wherein the inner surface of said closed frame is nonreflective.

* * * * *